United States Patent [19]

Hauser

[11] Patent Number: 5,545,029

[45] Date of Patent: Aug. 13, 1996

[54] EQUIPMENT FOR FILLING ONE OR MORE CASTING MOLDS WITH CASTABLE, LIQUID MATERIALS

[75] Inventor: Erhard Hauser, Schoffengrund, Germany

[73] Assignee: Wilhelm Hedrich Vakuumanlagen GmbH & Co. KG, Ehringshausen-Katzenfurt, Germany

[21] Appl. No.: 262,187

[22] Filed: Jun. 20, 1994

[30] Foreign Application Priority Data

Jun. 18, 1993 [DE] Germany ........................... 43 20 121.0
Dec. 30, 1993 [DE] Germany ........................... 43 44 922.0

[51] Int. Cl.$^6$ ................................................. B29C 45/02
[52] U.S. Cl. ................. 425/557; 425/147; 425/171; 425/200; 425/555; 425/558; 425/559
[58] Field of Search ...................... 425/145, 147, 425/171, 200, 555, 557, 558, 559, 560, 588, 449; 92/5 R, 10, 13.4, 13.51, 85, 85 B

[56] References Cited

U.S. PATENT DOCUMENTS

| | | | |
|---|---|---|---|
| 4,135,180 | 1/1979 | White ........................... | 366/336 |
| 4,257,992 | 3/1981 | Schulte et al. ................ | 264/45.3 |
| 4,317,647 | 3/1982 | Hauser ......................... | 417/339 |
| 4,752,201 | 6/1988 | Kauffman et al. ............ | 425/171 X |
| 4,823,992 | 4/1989 | Fiorentini .................... | 222/333 |
| 5,112,212 | 5/1992 | Akselrud et al. ............. | 425/557 |
| 5,119,866 | 6/1992 | Mihara ........................ | 425/555 X |
| 5,187,001 | 2/1993 | Brew ........................... | 425/147 X |

FOREIGN PATENT DOCUMENTS

| | | |
|---|---|---|
| 895216 | 12/1982 | Belgium . |
| 1244249 | 1/1960 | France . |
| 2544749 | 4/1977 | Germany . |
| 3420222 | 9/1989 | Germany . |
| 4208769 | 10/1992 | Germany . |
| 124222 | 7/1985 | Japan ........................... 425/555 |

OTHER PUBLICATIONS

Patent Abstracts of Japan; vol. 4, No. 92 (M–18) (574); 3 Jul. 1980 & JP–A–55 049 213 (Toshiba).

*Primary Examiner*—Robert J. Warden
*Assistant Examiner*—Krisanne M. Thornton
*Attorney, Agent, or Firm*—Longacre & White

[57] ABSTRACT

Equipment, in particular pressure gelling equipment, is provided to fill one or more casting molds with castable, liquid materials of which the components are fed by pumps through closable conduits to at least one plunger-cylinder system from where the components are moved to a mixing chamber and from there to the particular casting mold. In order to process especially abrasive casting materials of high viscosity and short pot life, the invention provides that at least one plunger-cylinder system be operated at a pressure substantially higher than are the pumps and that the mixing-chamber volume be comparatively slight.

19 Claims, 5 Drawing Sheets

EQUIPMENT FOR FILLING ONE OR MORE CASTING MOLDS WITH CASTABLE, LIQUID MATERIALS

BACKGROUND OF THE INVENTION

1. Field of the Invention

The present invention relates to equipment, in particular pressurized gelling equipment, to fill one or more casting molds with castable liquid materials. The castable materials are individually fed by pumps through conduits with shutoff devices to at least one plunger-cylinder system, then individually moved into a mixing chamber and from there to the particular casting mold.

2. Description of Related Art

German patent 34 20 222 describes equipment for metering castable components containing fillers comprising a pumping cylinder receiving a sliding plunger. The plunger divides the cylinder on one hand into a pump chamber with an intake and an outlet valve, communicating with a storage vessel receiving the component, and on the other hand into an operating chamber connected with a container receiving the drive liquid driving the plunger. A clearance-seal is provided between the two cylinder spaces. The drive liquid is selected in such manner as to be compatible with the individual component. The operative plunger surfaces come in contact with the drive liquid, and the individual components are substantially the same size; thus, substantially the same pressure is present on both sides of the plunger.

This equipment also provides that components containing fillers can be processed without deleterious leakages degrading equipment operation, even from storage vessels under vacuum. Sealing the plunger by a clearance-seal assures that the pumping cylinder shall be insensitive to abrasive fillers in the casting resin. This document further discloses using at least two plungers each filled with the individual component, said plungers being driven by a rigid mechanical coupling in the form of a plunger yoke. In an alternative embodiment, this document describes a stepped cylinder wherein again two cylinder chambers are formed for the components. Such known systems are preferentially used to seal the buffer(s), in particular with respect to abrasive fillers.

In DE 34 20 222 it is not disclosed that the plunger-cylinder system is designed for a high operational pressure, but instead discloses an air pressure in the range of 6–15 bar. Because of flammable material being used, the use of air pressure of 100 bars is not acceptable.

German patent document 42 08 769 A1 discloses equipment for filling one or more casting molds with castable materials, the individual components being held in storage vessels each of which is fitted with one pump. To process rapid-setting casting materials of which the individual components are prepared at precisely specified mixing ratios, this document provides that the pumps be connected to at least one synchronizing metering system through conduits that can be shut off by valves, and in that the metering system consist of at least two metering chambers within which mechanically yoked metering plungers are made to move in controlled manner. The synchronizing metering system is connected by conduits which can be blocked by valves and through an in-line mixer with at least one casting spout. This equipment allows accurate observation of the mixing ratios. The individual components can be accurately metered and continuously intermixed in the mixer. German patent document 42 08 769 A1 furthermore provides with respect to rapid-setting casting materials that the volume of casting material be minimized in the mixing and feed zones. However this known equipment is used foremost to shift the material preparation to the casting mold in order to minimize the reacting material in the supply conduits and elements. Thus German patent document 42 08 769 A1 discloses a system wherein the pumping arrangement is provided upstream of the metering arrangement.

As regards high-viscosity casting resin and short pot life, there is a requirement for small mixing chambers to preclude the material from hardening in the feed conduits. On the other hand such small mixing chambers entail high flow impedance in turn requiring commensurate pumping power to achieve the predetermined flow.

On the other hand an increase in pumping power— especially where the casting materials are abrasive—entails high wear in the pump zone. Moreover high pumping power demands lower metering accuracy by the pump.

In the light of this state of the art, it is the object of the invention to further develop equipment of the initially cited kind in such manner that especially abrasive casting materials of higher viscosity and short pot life can be processed.

The invention solves this problem in that at least one plunger-cylinder system shall be designed for a substantially higher operating pressure than that in the pumps and in that the mixing-chamber volume is relative small.

In the equipment of the invention, at least one plunger-cylinder system assume(s) the function of a pressure converter. The output pressure generated by the buffering element, respectively, is substantially higher than the pressure of the pumps associated with the storage vessels. This output pressure is controlled in such manner that it suffices also for abrasive casting materials of high viscosity and short pot lives precisely in association with the small mixing chamber provided by the invention. Illustratively at least one plunger-cylinder system can be designed for an operational pressure in the range of 10 to 200 bars and more; at an operational pressure of 100 bars and an assumed plunger diameter of 250 mm, the plunger will exert a compression of $4.9 \times 10^4$ kp. The pumps associated with the storage vessels do not undergo the mold-filling procedure proper and compared with the plunger-cylinder systems may be designed for considerably lower output pressures, as a consequence of which wear due to high pumping power is not experienced. Another advantage of the invention is that the pumps associated with the storage vessels no longer are required to function as metering means because this function is now assumed by at least one system of plunger and cylinder. Consequently the pumps are simpler in design and operation and thereby more economical.

In the invention the single system of plunger and cylinder with two cylinder chambers for the individual components may be used, where called for with a clearance-seal such as disclosed in the German patent 34 20 222 or with other sealing means between the plunger(s) and the cylinder wall. Again at least two plunger-cylinder systems may be provided for the individual casting components, communicating with one common or several mixing chambers.

Illustratively at least one plunger-cylinder system can be powered by a drive liquid compatible with the particular individual casting component as already described in the German patent document 34 20 222 C2. However such a drive liquid compatible with the individual casting component may evince excessive viscosity for the regulators of the drive fluid. In this respect the invention provides that at least one plunger-cylinder system comprise a drive plunger for the individual component or casting material loaded by pressurized fluid, and an output plunger driven by the drive plunger by means of an intermediate fluid. The geometric spacing between the drive fluid and the individual component always precludes contact between the drive liquid and the individual component and accordingly the parts of the drive system are not contaminated by the individual components. Preferably the at least one plunger-cylinder system is driven hydraulically.

In the invention the output plunger may comprise a plunger rod passing through the drive plunger and through the cylinder head, or the drive plunger may comprise a rod passing through the cylinder head to ascertain the quantity of stored component in the particular plunger-cylinder system.

In a further embodiment mode of the invention, the plungers of the at least one plunger-cylinder system are linked rigidly together or in a variably preselected coupling ratio. If the plungers are rigidly linked, fixed composition of casting materials can be observed. Illustratively such a rigid coupling can be implemented by a plunger-cylinder system with stepped plungers and two cylinder chambers.

Another embodiment mode consists in mounting at least two separate plunger-cylinder systems with plungers rigidly joined, for instance by a yoke linking the plungers directly or else their rods. As regards a variable and preselected coupling on the other hand, operation may be carried out with casting materials of different compositions without the need to reconvert the plunger-cylinder systems or their drive. Furthermore the drive for the plungers of the plunger-cylinder systems also may be designed for a variable drive ratio of the plunger elements or for a variable mixing ratio of the individual components. As a result it will be feasible to vary for instance the quality of individual parts in order that one part of a subsequent molded article be of greater hardness while another part shall be more flexible. Illustratively the amount of flexibilizer may be varied while the mold is being filled, for instance by means of a third pump with associated storage vessel.

The coupling between the plunger elements of the at least one plunger-cylinder system can be implemented for instance in mechanical, electrical, electronic manner and/or by a pressurized fluid.

The invention provides moreover that the drive of the plungers is designed in such manner that the gelling pressure on the particular mold be kept constant during the gelling of the casting resin. As a result the at least one plunger-cylinder system shall fulfill two functions, namely metering which otherwise would be carried out by metering pumps and buffering to maintain the gelling pressure on the casting mold, any material dwindling occurring during gelling being compensated by the plunger-cylinder system(s).

The mixing chamber may be a static or a dynamic mixer.

The invention also allows designing the equipment to fill several casting molds. In one embodiment mode a buffer preceded by a shutoff device such as a check or shutoff valve is mounted in the feed conduit leading from the mixing chamber to the individual casting molds.

In an alternative embodiment mode of the invention regarding in particular casting materials of short pot lives, a separate mixing chamber, preferably a static mixer with subsequent buffer shall be associated with each casting mold and shutoff devices such as check or shutoff valves are mounted in the feed conduits for the individual components. Because the individual components are moved to the immediate vicinity of the casting mold, the reactive mixture in the particular feed conduit will be minimized. The buffer plunger can be loaded by a pressurized medium, but also by spring means and it may also be displaced mechanically.

Further objects, advantages and features and applications of the present invention are discussed in the description below and in relation to the drawings. All features, whether described and/or shown graphically, are objects of the present invention whether considered per se or in arbitrary combinations, regardless of their summarization in the claims or the claims' inter-relations.

DETAILED DESCRIPTION OF THE PREFERRED EMBODIMENTS

Figure 1:
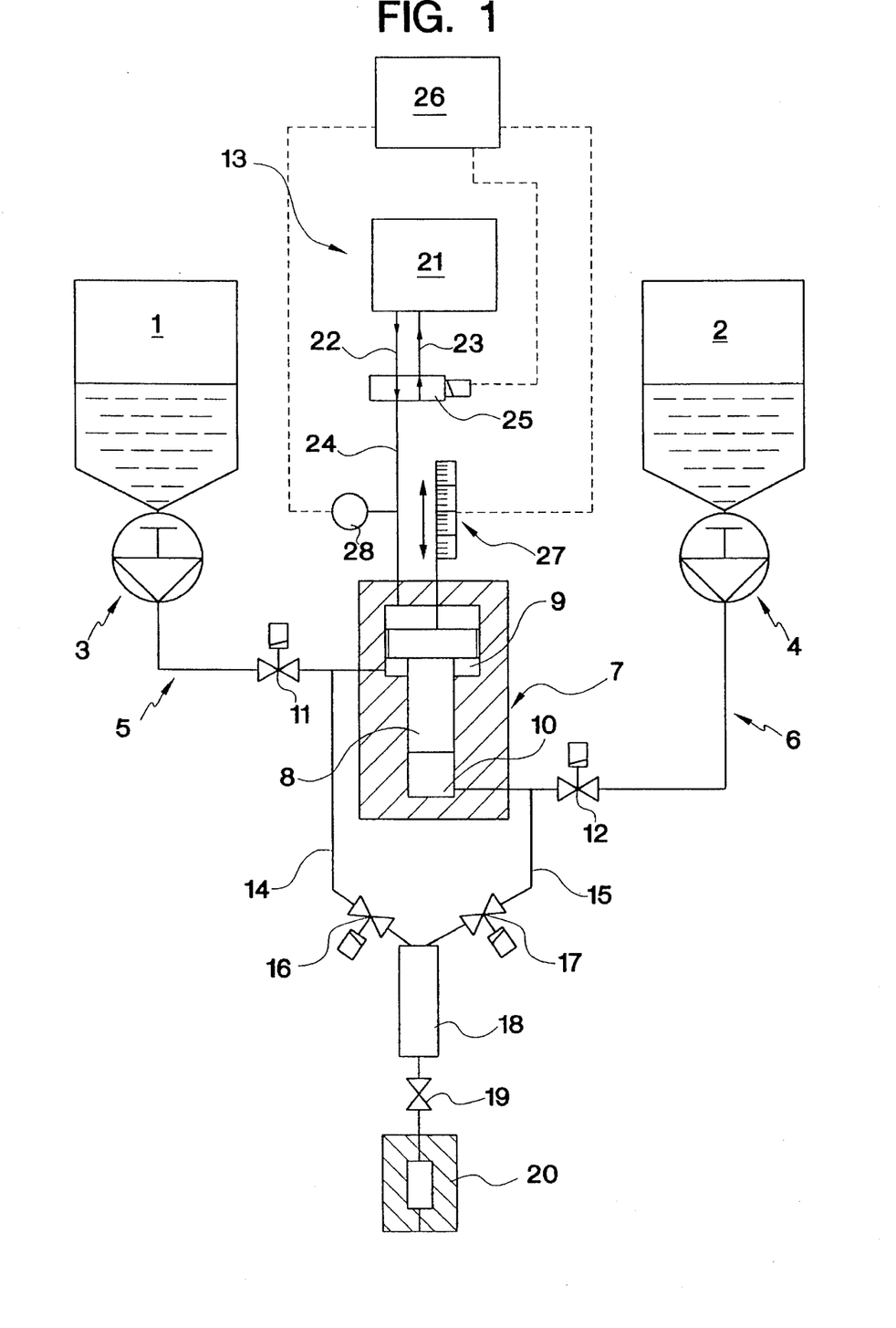
FIG. 1 is a functional diagram of an embodiment mode of equipment of the invention comprising a plunger-cylinder system with stepped plunger.

The equipment of FIG. 1 comprises two storage vessels 1 and 2 for the individual casting components, each associated with a pump 3 and 4 respectively. The particular casting component is fed from the storage vessels 1, 2 through feed conduits 5, 6 to a double plunger-cylinder system 7. The plunger-cylinder system is fitted with a stepped plunger 8 which, together with the cylinder surface enclosing it, forms two metering chambers 9, 10. As shown by FIG. 1, the component in the storage vessel 1 is fed into the metering chamber 9 whereas the component of the storage vessel 2 is fed into the metering chamber 10. The stepped plunger 8 is forced into its uppermost position during filling. Next the valves 11, 12 in the feed conduits 5, 6 are moved into the shutoff positions and the drive 13 for the double-acting plunger-cylinder system 7 is switched on whereby the metering chambers 9, 10 will be discharged at least in part. As a result the two components pass through feed conduits 14, 15 of which the valves 16, 17 are open into a mixing chamber 18 and from there through a shutoff-valve fitted casting spout 19 into a casting mold 20.

The drive 13 for the double-acting plunger-cylinder system 7 in this instance is a hydraulic unit 21, with feed conduits 22, 23, 24 and an in-line servo-valve 25.

The drive also comprises a control 26 with an incremental pickup 27 and where called for a pressure sensor 28. The control 26 regulates the speed of the stepped plunger 8 and thereby the discharge rate of the components from the metering chambers 9 and 10.

Compared to the case of the pumps 3 and 4, the plunger-cylinder system 7 is designed for a considerably higher operational pressure. This output pressure from the plunger-cylinder system 7 is chosen such as to account for the flow impedance resulting from the comparatively small volume of the mixing chamber 18. The pumps 3 and 4 merely need now move the components to the plunger-cylinder system 7.

Again the components are metered by the plunger-cylinder system 7. As a result the pumps 3 and 4 are much less loaded. Moreover the wear otherwise incurred because of high pumping power from the pumps 3 and 4, especially in the presence of abrasive casting materials, is avoided.

Figure 2:
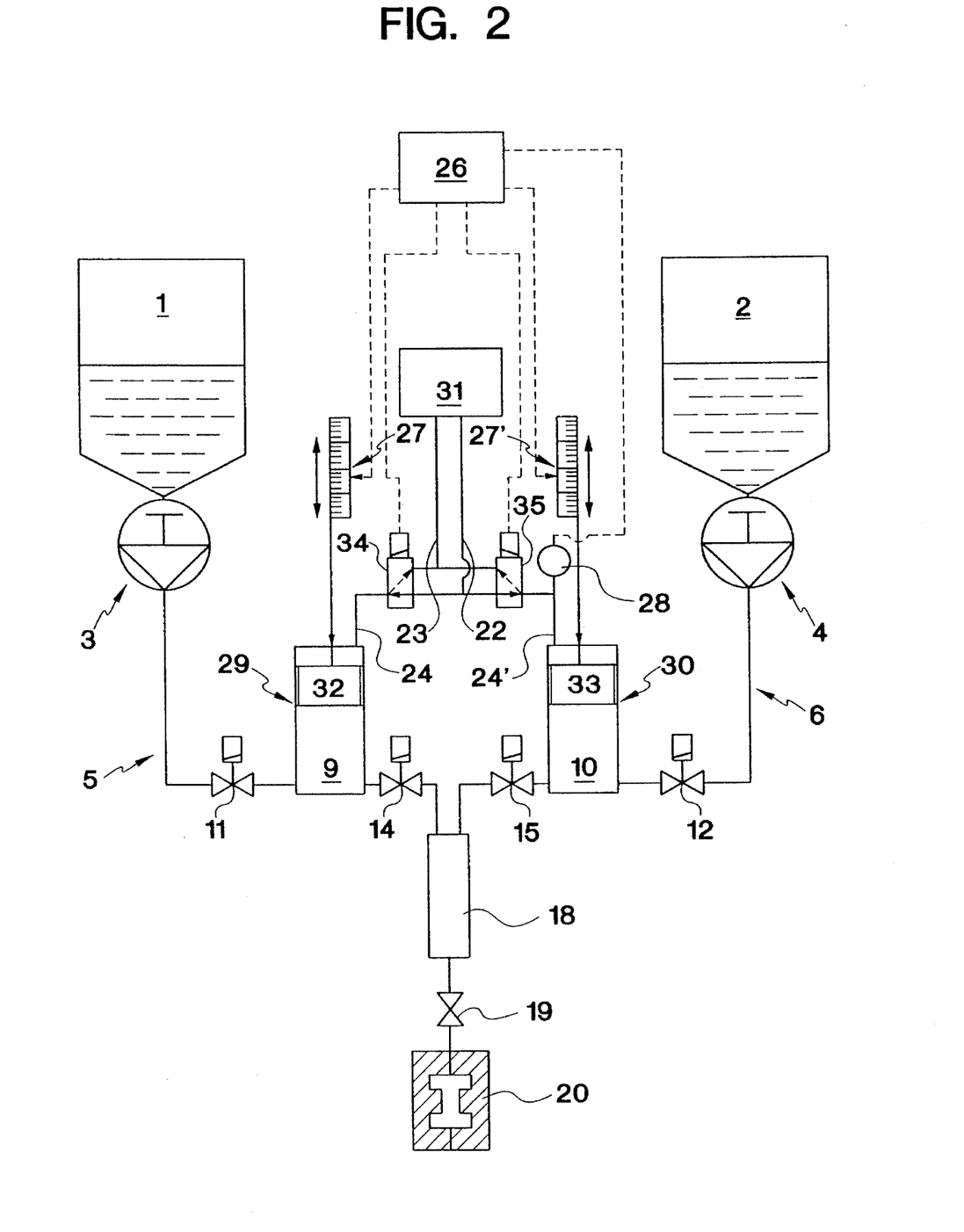
FIG. 2 is a further embodiment mode of equipment of the invention with two separately mounted plunger-cylinder systems.

Those components in FIGS. 2 which correspond to the same ones in FIG. 1 are denoted by the same reference numerals and therefore need not be discussed in detail again. The essential difference of the equipment of FIG. 2 is that it comprises two separate plunger-cylinder systems 29, 30 with a modified drive 31 for the plungers 32 and 33. By coupling the plungers 32, 33 in variable, preselected coupling ratios, casting may be carried out with different compositions without the need to reconvert the plunger-cylinder systems 29, 30. Again the drive 31 comprises a hydraulic unit with feed conduits 22, 23, 24, 24'. The valves 34, 35 of this embodiment mode are servo-valves and are opened by the control 26 as a function of the signals emitted by the incremental pickup 27, 27' as a result of which pressurized fluid is fed in relation to the preselected coupling ratio to either plunger-cylinder system 29, 30. Illustratively the ratio of the rates of pressurized fluid of either plunger-cylinder system may be 2 to 1. As already stated, this ratio is preselectable by the control 26. The equipment of FIG. 2 also comprises a pressure sensor 28 which is connected to the control 26 and monitors the follow-up pressure at the casting mold 20 during the gelling phase, ie maintains it by means of the plunger-cylinder system 29, 30.

Figure 3:
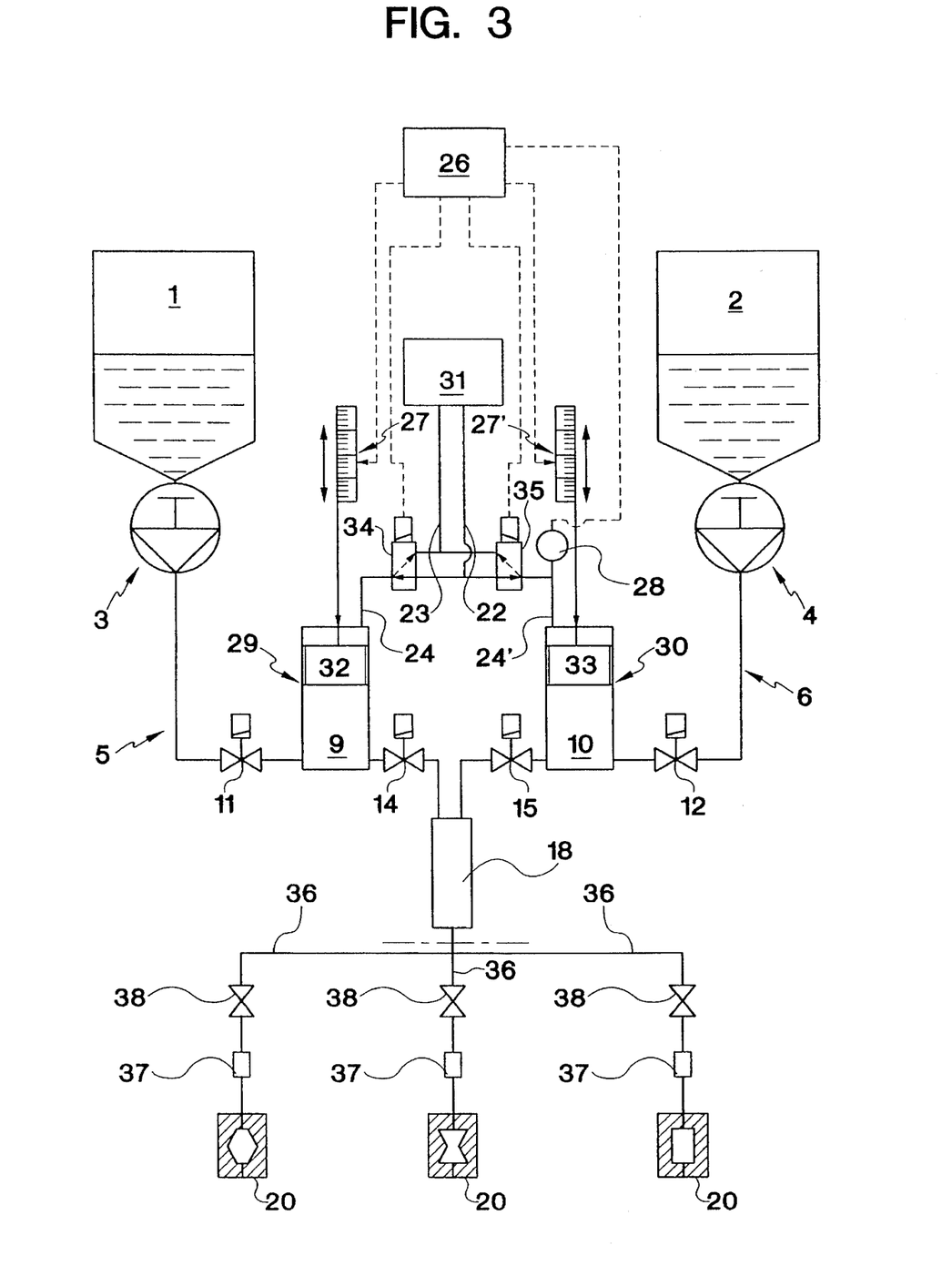
FIG. 3 is a functional diagram of equipment of the invention similar to that of FIG. 2 but designed to fill several casting molds.

The embodiment mode of FIG. 3 corresponds diagrammatically as far as the dash-dot line to that of FIG. 2. In this case however several casting molds 20 instead of one are filled with casting material. In this manner the equipment cost is advantageously compensated by the component metering using the two plunger-cylinder systems 29, 30. From the mixing chamber 18 the casting material is supplied through feed conduits 36 to three pressure-casting molds 20. A buffer 37 is present in the manifold conduits 36 and is preceded by a shutoff device 38, ie a shutoff valve. A specific compression may be maintained by the buffers 37 during the solidification—entailing shrinkage—of the casting material in the casting mold 20, the buffers 37 replenishing casting material to the associated casting molds 20 to compensate said material dwindling. Because the shutoff device 38 is in-line in the feed conduits 36, the casting molds 20 can be filled independently of each other.

Figure 4:
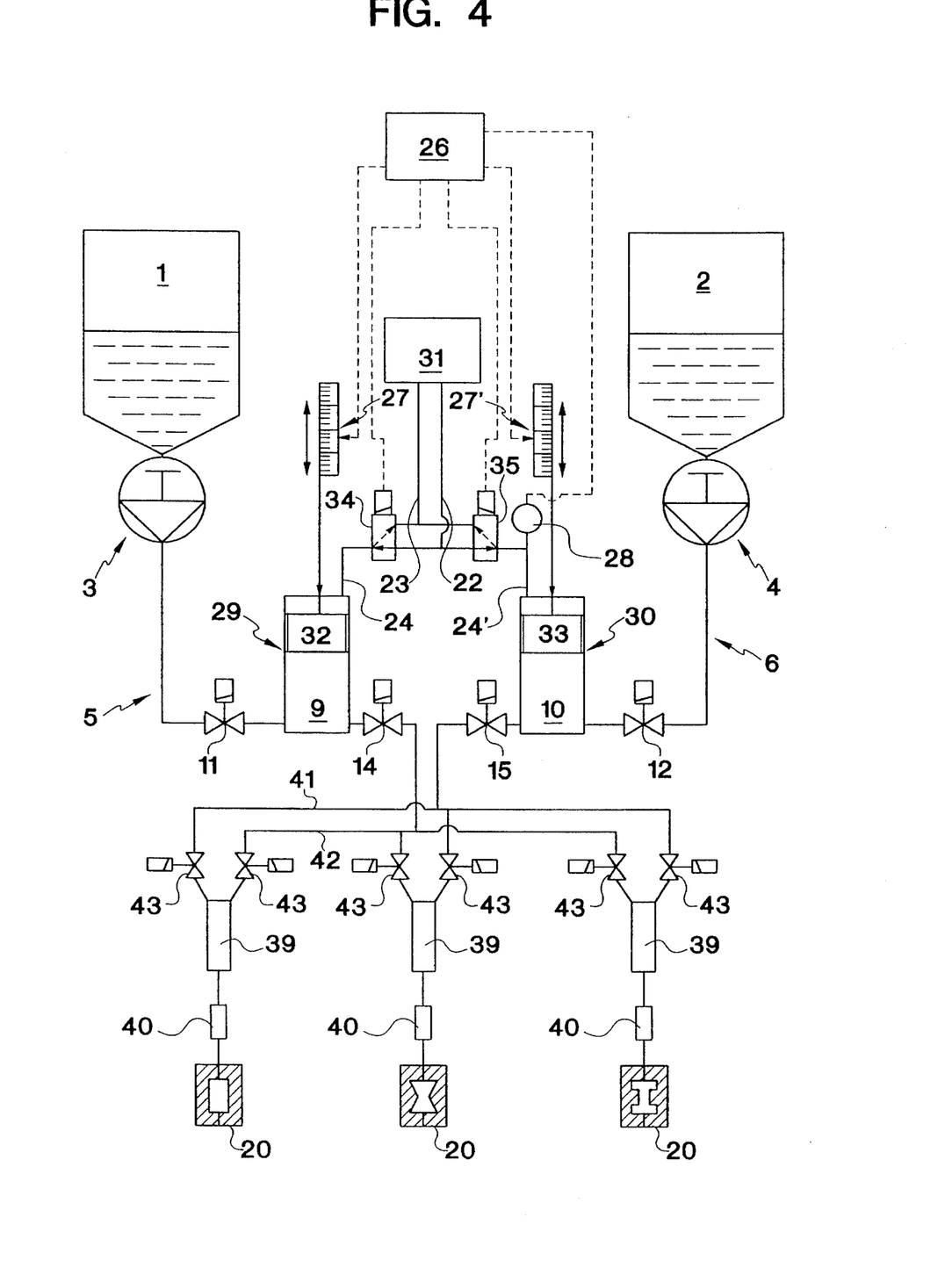
FIG. 4 is a variation of the embodiment of FIG. 3 with one separate mixing chamber associated to each casting mold.

Certain casting materials evince short pot lives as a result of which the reactive material volume in these feed conduits must be decreased to prevent hardening. For that purpose a separate mixing chamber, for instance a static mixer 39 is associated with each casting mold 20. The components of the casting material are fed by the conduits 41, 42 of the two plunger-cylinder systems 29, 30 to the particular static mixers 39 associated with the particular casting molds 20. Again a buffer 40 is present in the feed conduits between the static mixers 39 and the casting molds 20 to keep the casting material in the casting molds 20 pressurized during solidification and to compensate the material dwindling by replenishing casting material. Again in order to make possible the filling of the casting molds 20 independently of one another, a shutoff device 43, for instance a shutoff valve, is mounted in each feed conduit 41, 42 before the mixing chambers 39.

The buffers 37, 40 of FIGS. 3 and 4 may but are not required to comprise control switches controlling the casting procedure. Illustratively a buffer may be used without control switches, which would be mounted near the casting mold(s) of which the buffer plunger moves out of the way elastically or of which the storage volume increases elastically when the pressurization of the casting material increases. The buffer may be elastic, for instance being in the shape of a tube or membrane, or it may be spring-loaded or be loaded by a pressure medium. As the volume stored in the buffer increases, so will the pressure. If now for instance after filling a predetermined main quantity into the casting mold the buffer will be switched to "maintain-pressure" operation, then the buffer may be loaded at this pressure to be maintained and following a previously ascertained time of compensation may then be considered being filled with respect to the required follow-up quantity of casting material during solidification. Thereupon for instance a further casting mold may be filled in the manner described in the German patent document 27 48 982 C2 by blocking the source material from the casting route to the first casting mold 20 by the shutoff valve 38 in the particular feed conduit of FIG. 3 or by blocking it by means of the shutoff valves 43 in the feed conduits 41, 42 for the equipment of FIG. 4

Another procedure may be implemented in that the buffers 37, 40 and the casting molds 20 are loaded by the prescribed quantities from the two metering devices, ie by the plunger-cylinder systems 29, 30, to reach the volume of the "maintain-pressure" mode, provided of course that said prescribed quantities were previously empirically determined. In this case also the valves 38, 43 will be shut off, ie blocked when the nominal quantities from the metering devices 29, 30 are being reached.

Another embodiment mode of the buffer employs a pressurizing medium which can be turned on and off to control the buffer volume for pressure upkeep. Depending on the design, such a buffer may be empty or full when the mold is being filled. If during mold filling the buffer is full, the pressurizing medium is turned on to maintain the pressure. If on the other hand the buffer is empty during mold filling, for instance in order to achieve a minimum of casting material in the buffer to account for short pot life, then the buffer must be filled at the end of the filling procedure. In the latter case the pressurizing medium to displace the plunger or to change the stored volume in the buffer shall be turned off and later shall be turned on again. Again this mode of operation may be initiated by a switch for the pressurizing medium or by a timing switch turning it on.

Figure 5:
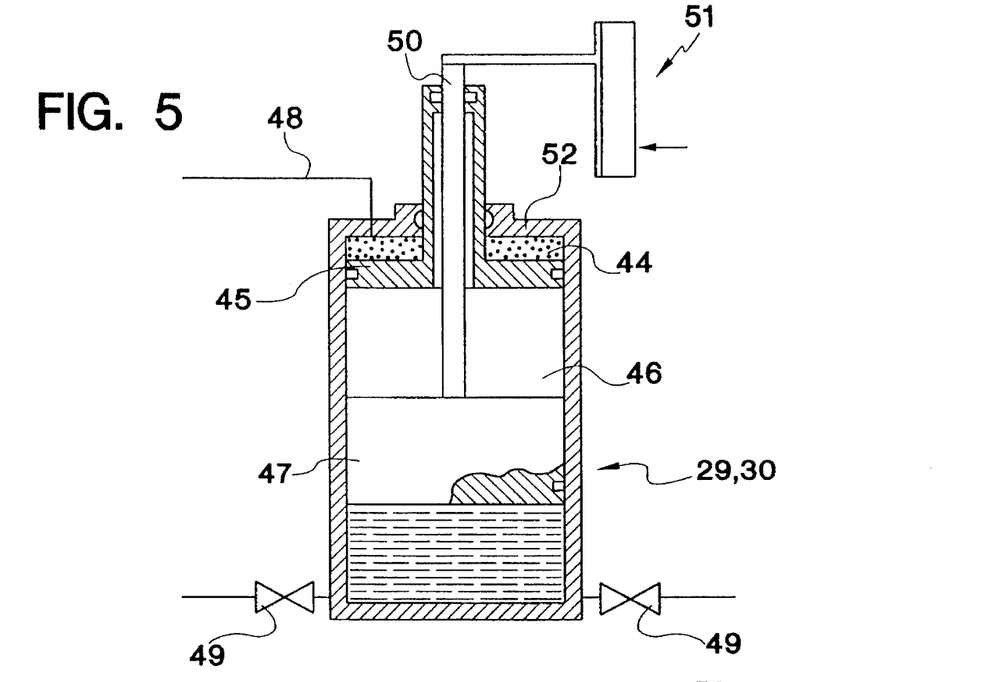
FIG. 5 is an illustrative embodiment mode of a plunger-cylinder system.
Figure 6:
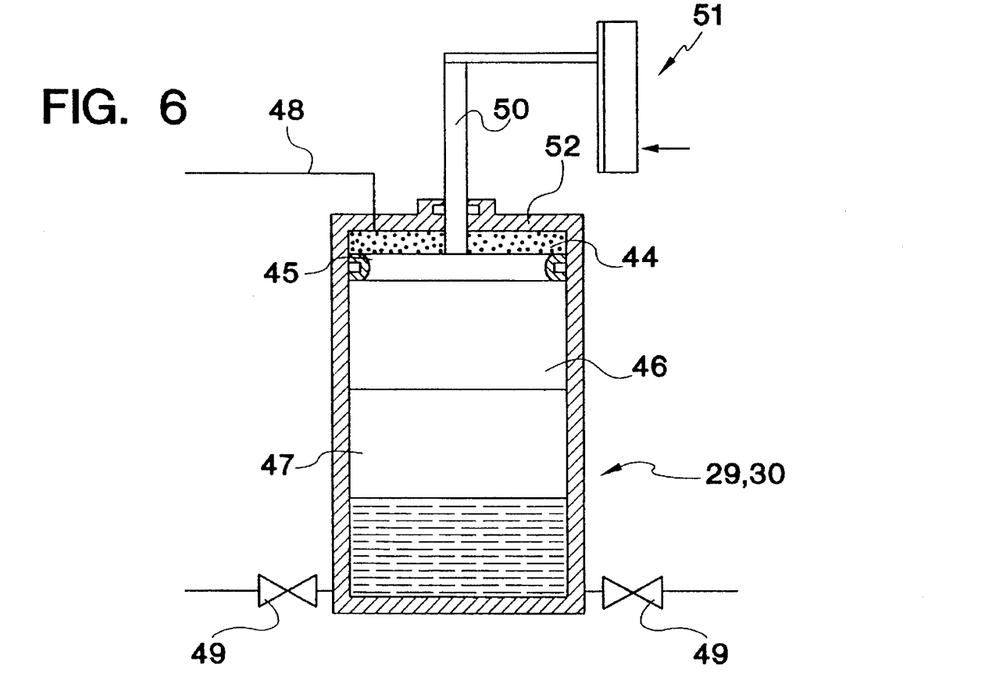
FIG. 6 is a further embodiment mode of a plunger-cylinder system.

In principle the plunger-cylinder systems can be driven by a drive fluid compatible with the components of the casting material. However such a drive liquid sometimes will be too viscous for the control devices of the plunger-cylinder systems. In such cases the invention shown in FIGS. 5 and 6 provides that the corresponding plunger-cylinder system, for instance that of FIGS. 2 through 4, comprises a drive plunger 45 loaded by a pressurizing medium 44, in particular a hydraulic liquid, and in turn acting by means of an intermediate fluid 46 on an output plunger 47, the output plunger 47 in turn displacing the particular component, for instance into the mixing chamber 18 or into the separate mixing chambers 39 of FIG. 4. The intermediate fluid between the drive plunger 45 and the output plunger 47 is selected in such manner as to be compatible with the particular component. The geometric spacing between the intermediate fluid 46 and the component precludes contact between the intermediate fluid 46 and the component and, inversely, assures that the components of the drive system will not be contaminated by the components of the casting material.

The pressurizing medium 44 is supplied through the feed conduits 48. The intakes and outlets of the plunger-cylinder system 29, 30 can be opened and closed by shutoff devices 49.

The two embodiment modes of FIGS. 5 and 6 differ in how the particular stored volume of the component within the plunger-cylinder system 29, 30 shall be detected. In the embodiment mode of FIG. 5, the stored volume is detected by the output plunger 47 being fitted with a rod 50 passing through the drive plunger 45 and the cylinder head 52 of the plunger-cylinder system 29, 30, as a result of which the displacement of the rod 50 is converted by an incremental pickup 51 into the particular filling level. In this embodiment mode any dwindling of intermediate fluid 46 can be compensated through the plunger rod 50 which in this case is hollow. On the other hand detection of the stored quantity of component takes place indirectly in the embodiment mode of FIG. 6 by means of the position of the drive plunger 45, in this case too the motion of the plunger rod 50 passing through the cylinder head 52 serving as the setpoint for the incremental pickup 51.

While the invention has been shown and described with reference to several embodiments, it is understood by those of skill in the art that numerous changes may be made without departing from the spirit and scope of the invention.

I claim:

1. Equipment for filling at least one casting mold with a castable liquid material, said equipment comprising:

storage means for storing casting components of said castable liquid material, pumping means for pumping said casting components through conduit means from said storage means, at least one plunger-cylinder system for receiving said casting components from said storage means, said at least one plunger-cylinder system comprising a plunger means sliding disposed within a cylinder, said plunger means defining a drive plunger upon which a pressurizing medium acts to move said drive plunger, and an output plunger which moves in response to a movement the drive plunger, and a mixing chamber for receiving and mixing said casting components delivered from said at least one plunger-cylinder system to form said castable liquid material, the castable liquid material being delivered to at least one casting mold, wherein the plunger means of said at least one plunger-cylinder system divides said cylinder into a pump chamber filled by said casting components, and an operating chamber in fluid communication with a drive fluid driving said drive plunger, operating surfaces of the plunger means which contact said casting components and said drive fluid having substantially equal surface areas, and wherein said at least one plunger-cylinder system is designed for a substantially higher operational pressure than an operational pressure of said pumping means.

2. The equipment defined in claim 1, wherein said at least one plunger-cylinder system comprises at least two metering chambers for the casting components.

3. The equipment defined in claim 1, wherein at least two plunger-cylinder systems are provided for the casting components.

4. The equipment defined in claim 1, wherein said drive plunger drives said output plunger by means of an interfluid provided between said drive plunger and said output plunger.

5. The equipment defined in claim 1, wherein the output plunger comprises a rod passing through the drive plunger and a cylinder head of said cylinder, said rod controlling an indicating means for indicating a stored quantity of said casting components in the at least one plunger-cylinder system.

6. The equipment defined in claim 1, wherein the drive plunger comprises a rod passing through a cylinder head of said cylinder, said rod controlling an indicator means for indicating a stored quantity of said casting components in the at least one plunger-cylinder system.

7. The equipment defined in claim 1, wherein a drive means for the plunger of the at least one plunger-cylinder system maintains a gelling pressure at a particular casting mold during a casting-resin gelling phase.

8. The equipment defined in claim 1, wherein a drive means for the plunger of the at least one plunger-cylinder system is designed for a mutually variable drive ratio of the plunger in order to achieve a mutually variable mixing ratio of the casting components.

9. The equipment defined in claim 1, wherein a buffer means for compensating for a volume change during solidification of said castable liquid material preceded by a secondary shutoff device is mounted in a component feed conduit to each of said at least one casting mold.

10. The equipment defined in claim 1, wherein a separate mixing chamber is associated with each of said at least one casting mold and in that at least one shutoff device is mounted in each mixing chamber feed conduit delivering the casting components from said at least one plunger-cylinder system to the mixing chamber.

11. The equipment defined in claim 9, wherein a buffer plunger of the buffer means is mechanically displaceable in response to a pressure of said casting components.

12. Equipment for filling at least one casting mold with a castable liquid material, said equipment comprising:

a storage means for storing at least one casting component of said castable liquid material;

pump means for pumping said at least one casting component of said castable liquid material through conduits means, said conduit means being provided with shutoff means for blocking a flow of said at least one casting component;

at least one plunger-cylinder system for receiving said at least one casting component from said storage means through said conduit means, said at least one plunger-cylinder system comprising a plunger means slidingly disposed within a cylinder, said plunger means defining a drive plunger upon which a pressurizing medium acts to move said drive plunger within said cylinder, and an output plunger which moves in response to movement of the drive plunger;

a mixing means for receiving and mixing said at least one casting component delivered from said at least one plunger-cylinder system to form said casting material, the casting material being delivered to at least one casting mold, wherein said at least one plunger-cylinder system is provided downstream of said pump means, and wherein said plunger means divides said cylinder into a pump chamber filled by said at least one casting component, and an operating chamber in fluid communication with a drive fluid driving said plunger means to move within said cylinder.

13. The equipment defined in claim 12, wherein said at least one plunger-cylinder system comprises a metering means for metering an amount of said at least one casting component received in said at least one plunger-cylinder system.

14. The equipment defined in claim 13, wherein said at least one plunger-cylinder system comprises a drive means for maintaining a follow-up pressure at said at least one casting mold during a gelling phase.

15. The equipment defined in claim 12, wherein the output plunger comprises a rod passing through the drive plunger, said rod controlling an indicating means for indicating a stored quantity of said at least one casting component in the at least one plunger-cylinder system.

16. The equipment defined in claim 12, wherein the drive plunger comprises a rod passing through a cylinder head of said cylinder, said rod controlling an indicating means for indicating a stored quantity of said at least one casting component in the at least one plunger-cylinder system.

17. The equipment defined in claim 1, further comprising a seal provided between the pump chamber and the operating chamber.

18. The equipment defined in claim 1, wherein said drive plunger and said output plunger are formed as a unitary body, said output plunger being disposed to define two metering chambers in the cylinder which receive said casting components from said storage means.

19. The equipment defined in claim 12, wherein said drive plunger and said output plunger are formed as a unitary body, said output plunger being disposed to define two metering chambers in the cylinder which receive said at least one casting component from said storage means.

* * * * *